(12) United States Patent
Moon et al.

(10) Patent No.: US 9,712,605 B2
(45) Date of Patent: Jul. 18, 2017

(54) METHOD AND SYSTEM FOR PROVIDING SERVER VIRTUAL MACHINE FOR REAL-TIME VIRTUAL DESKTOP SERVICE, AND SERVER DEVICE SUPPORTING THE SAME

(71) Applicant: Electronics and Telecommunications Research Institute, Daejeon (KR)

(72) Inventors: Jong Bae Moon, Daejeon (KR); Dae Won Kim, Daejeon (KR); Seong Woon Kim, Gyeryong-si (KR); Sun Wook Kim, Hwaseong-si (KR); Soo Cheol Oh, Daejeon (KR); Jung Hyun Cho, Daejeon (KR); Hag Young Kim, Daejeon (KR); Myeong Hoon Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 379 days.

(21) Appl. No.: 14/338,989

(22) Filed: Jul. 23, 2014

(65) Prior Publication Data

US 2015/0201004 A1  Jul. 16, 2015

(30) Foreign Application Priority Data

Jan. 15, 2014 (KR) ........................ 10-2014-0005035

(51) Int. Cl.
*G06F 15/16* (2006.01)
*H04L 29/08* (2006.01)
(Continued)

(52) U.S. Cl.
CPC .......... *H04L 67/10* (2013.01); *G06F 9/45558* (2013.01); *H04L 67/42* (2013.01); *G06F 2009/4557* (2013.01)

(58) Field of Classification Search
CPC ................................ H04L 67/10; H04L 67/42
(Continued)

(56) References Cited

U.S. PATENT DOCUMENTS 8,261,268 B1 * 9/2012 Forgette .............. G06F 9/45558
718/1
2009/0327778 A1  12/2009 Shiga et al.
(Continued)

FOREIGN PATENT DOCUMENTS

JP         2010-015192 A    1/2010
KR   10-2010-0138689 A   12/2010
(Continued)

OTHER PUBLICATIONS

Kim et al. "Proposal for the use case of service provisioning according to user types", International Telecommunication Union, Telecommunication Standardization Sector, COM13-C-368 Rev.1, Oct. 22, 2013.

*Primary Examiner* — Philip B Tran
(74) *Attorney, Agent, or Firm* — Rabin & Berdo, P.C.

(57) ABSTRACT

Provided is a virtual desktop service, and disclosed is a system for providing a server virtual machine, including: a client configured to receive allocation of a virtual machine for using a virtual desktop service; a connection broker configured to control a type of virtual machine to be allocated to be classified according to user terminal registration information of the client, any one operation server to be selected among a plurality of operation servers, and the virtual machine to be allocated; the plurality of operation servers configured to provide the client with a virtual machine under a control of the connection broker; and a shared storage configured to store data related to the client for providing the virtual machine, and provide the stored data to the operation servers, a method of providing a server virtual machine, and a server device supporting the same.

8 Claims, 8 Drawing Sheets

(51) Int. Cl.
*H04L 29/06* (2006.01)
*G06F 9/455* (2006.01)

(58) Field of Classification Search
USPC .................................................. 709/203, 226
See application file for complete search history.

(56) References Cited

U.S. PATENT DOCUMENTS

| | | | |
|---|---|---|---|
| 2010/0070978 A1* | 3/2010 | Chawla | G06F 9/5077 |
| | | | 718/105 |
| 2010/0325278 A1 | 12/2010 | Heim et al. | |
| 2011/0154320 A1* | 6/2011 | Verma | G06F 8/63 |
| | | | 718/1 |
| 2012/0084369 A1* | 4/2012 | Henriquez | H04L 67/08 |
| | | | 709/206 |
| 2012/0084381 A1* | 4/2012 | Alladi | G06F 9/544 |
| | | | 709/213 |
| 2012/0144112 A1 | 6/2012 | Nishikawa et al. | |
| 2012/0173731 A1 | 7/2012 | Lin et al. | |
| 2012/0179820 A1 | 7/2012 | Ringdahl et al. | |
| 2013/0031602 A1 | 1/2013 | Kimizuka | |
| 2013/0227566 A1* | 8/2013 | Higuchi | G06F 9/45533 |
| | | | 718/1 |

FOREIGN PATENT DOCUMENTS

| | | |
|---|---|---|
| KR | 10-2011-0056843 A | 5/2011 |
| WO | WO 2011-122138 A1 | 10/2011 |

\* cited by examiner

METHOD AND SYSTEM FOR PROVIDING SERVER VIRTUAL MACHINE FOR REAL-TIME VIRTUAL DESKTOP SERVICE, AND SERVER DEVICE SUPPORTING THE SAME

CROSS-REFERENCE TO RELATED APPLICATIONS

This application claims priority to and the benefit of Korean Patent Application No. 10-2014-0005035 filed in the Korean Intellectual Property Office on Jan. 15, 2014, the entire contents of which are incorporated herein by reference.

TECHNICAL FIELD

The present invention relates to a method and a system for providing a server virtual machine capable of providing a virtual desktop environment according to a type of remote user in a server virtualization environment, and a device supporting the same.

BACKGROUND ART

In relation to a virtual machine service in the related art, MS provides a terminal service, which is called remote desktop connection (RDC), by using a remote desktop protocol (RDP), and LINUX provides a terminal service, which is called virtual network computing (VNC) by using a remote frame buffer (RFB) protocol. Further, Teradici provides a terminal service solution with a protocol, which is called a PC-over-IP (PCoIP). In order to perform the virtual desktop service by using the aforementioned method, the virtual desktop function needs to be provided to every user. To this end, in the method of the related art, a device (CPU, memory, HDD, USB, and the like) corresponding to each user needs to be allocated to the user, and an OS image for a user needs to be allocated to the user.

In the meantime, in order to provide the aforementioned function, a published tool may include a virt-tool, a virt-manager, and the like, and further, a virtual machine for a user using a program, such as xendesktop, VMware Fusion, or workstation of the Citrix Company may be created and generated. However, since the methods in the related art adopt the manually provided tool, there is a problem in that the methods in the related art are not appropriate to provide a real-time virtual service.

SUMMARY OF THE INVENTION

The present invention has been made in an effort to provide a method and a system for providing a server virtual machine, which are capable of generating a VM in real time when a user request is made, and providing a real-time virtual desktop service based on the generated VM, and a device supporting the same.

An exemplary embodiment of the present invention provides a system for providing a server virtual machine, including: a client configured to receive allocation of a virtual machine for using a virtual desktop service; a connection broker configured to control a type of virtual machine to be allocated to be classified according to user terminal registration information of the client, any one operation server to be selected among a plurality of operation servers, and the virtual machine to be allocated; the plurality of operation servers configured to provide the client with a virtual machine under a control of the connection broker; and a shared storage configured to store data related to the client for providing the virtual machine, and provide the stored data to the operation servers.

The connection brokers may control a previously allocated virtual machine to be provided to the client according to the user terminal registration information, a specific virtual machine belonging to a virtual machine pool to be temporarily provided to the client, or a plurality of elements of virtual machine information to be provided and a selected specific virtual machine to be provided to the client.

The connection broker may control the virtual machine to be allocated by selecting an operation server having a relatively good server power measurement value or a relatively good server ability amount among the operation servers.

The operation server may control an OS image and a user disk image related to the client to be pre-generated and stored in order to provide the virtual machine.

The shared storage may pre-store an OS image and a user disk image for the provision of the virtual machine.

Another exemplary embodiment of the present invention provides a connection broker for supporting provision of a server virtual machine, including: a user management module configured to manage user terminal registration information for each client; an operation server management module configured to manage operation servers including a virtual machine allocated to the client; and a virtual machine allocation module configured to select and allocate a virtual machine of a specific operation server in connection with user terminal registration information about the client.

The virtual machine allocation module may support generation of an OS image and a user disk image for providing a virtual machine to the client, and control storage of the OS image and the user disk image.

The virtual machine allocation module may provide the operation server with storage location information of the OS image and the user disk image.

The user management module may classify the clients based on user terminal registration information into an allocated user to which a designated virtual machine is allocated, a pooled user, to which a virtual machine is temporarily allocated, and from which the allocated virtual machine is collected, and a multi-VM user to which a plurality of virtual machines is allocated.

The virtual machine allocation module may provide the allocated user type client with access information about a previously allocated on-state virtual machine and access permission information.

The virtual machine allocation module may provide the pooled user type client with access information and permission information about a virtual machine, which belongs to the virtual machine pool to be temporarily usable.

The virtual machine allocation module may provide the multi-VM user type client with information about the plurality of virtual machines, and access information and permission information about a virtual machine selected by the client.

The virtual machine allocation module may control an operation server having a relatively good server power measurement value or a relatively good server ability amount to be selected among the operation servers, and the selected operation server to be provided to the virtual machine.

Yet another exemplary embodiment of the present invention provides an operation server for supporting provision of a server virtual machine, including: one or more virtual machines provided to a client; a hypervisor configured to support driving of the virtual machine; and an agent configured to call an OS image and a user disk image pre-stored in a shared storage, and support provision of the virtual machine to the client.

The agent may support the generation of the OS image and the user disk image related to the client by using an image generator, and control the OS image and the user disk image to be stored in the shared storage.

The agent may store, update, and manage user information including information about a resource and OS information to be used in a virtual machine, which is to be operated by the client.

Still another exemplary embodiment of the present invention provides a method of providing a server virtual machine, including: confirming user terminal registration information about an accessing client; confirming a virtual machine to be allocated by a plurality of operation servers in connection with the user terminal registration information; and allocating and providing the virtual machine to the client corresponding to the user terminal registration information.

The providing of the virtual machine may include: any one of providing the client with a previously allocated virtual machine according to the user terminal registration information; temporarily providing the client with a specific virtual machine belonging to a virtual machine pool; and providing a plurality of elements of virtual machine information, and providing the client with a selected specific virtual machine.

The method may further include: generating an OS image and a user disk image related to the client before the providing of the virtual machine; and storing the OS image and the user disk image in a shared storage.

The providing of the virtual machine may include: selecting an operation server having a relatively good server power measurement value or a relatively good server ability amount among the operation servers; and providing a virtual machine of the selected operation server.

As described above, according to the method and the system for providing the server virtual machine, and the device supporting the same, the present invention may provide a user with a user OS image and a user disk image to be allocated within a short time for the virtual desktop service.

The present invention may allocate a virtual machine to a user within several seconds.

The present invention has a structure of allocating a prepared image file, thereby decreasing an operation, such as the generation of the VM and the copy of the image, and thus solving a problem due to a load of the server in a server virtualization environment.

Figure 1:
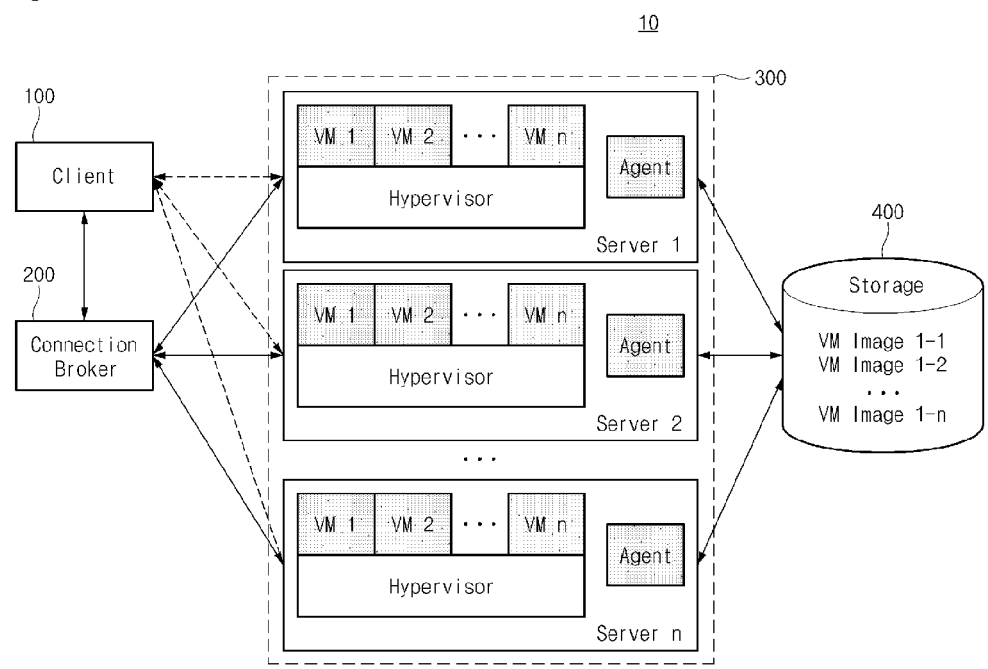
FIG. 1 is a diagram schematically illustrating a structure of a virtual desktop service according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, various exemplary embodiments of the present invention will be described in detail with reference to the accompanying drawings. In this case, it should be noted that the same elements will be designated by the same reference numerals in the accompanying drawings. Further, a detailed description of known functions and configurations incorporated herein will be omitted when it may make the subject matter of the present invention rather unclear. In the description below, it should be noted that only parts necessary for understanding operations according to various exemplary embodiments of the present invention will be described, and descriptions of other parts may be omitted so as to avoid unnecessarily obscuring the subject matter of the present invention.

FIG. 1 is a diagram schematically illustrating a structure of a virtual desktop service according to an exemplary embodiment of the present invention.

Referring to FIG. 1, a structure of a virtual desktop service 10 of the present invention may include a client 100, a connection broker (CB) 200, an operation server 300, and a shared storage 400. Here, the client 100 may means at least one or a plurality of user terminals. The client 100 may select user terminal registration information about an allocated user, a pooled user, a multi-virtual machine (VM) user, and the like in a registration process of the CB 200. In this process, a user request may be authorized or rejected according to an approval of a manager of the CB 200 based on the aforementioned user terminal registration information. Otherwise, the type of the user terminal belonging to the client 100 may be changed according to determination of a manager in a registration process of the CB 200, or the user terminal registration information may be determined according to a predefined specific policy. Otherwise, the user terminal registration information may be determined or changed according to various requests, such as a degree of charging or a service form by user's selection in the registration of the client 100.

The structure of the virtual desktop service 10 of the present invention is a service of enabling the user terminal to use VMs of the structure of the virtual desktop service 10 generated on a hypervisor present in a virtualization server of a data center or a service provider through a predetermined access protocol by installing a client program in the user terminal as illustrated in FIG. 1. In order to provide the client 100 corresponding to the user terminal with the VM, user profile information (user information file), an OS image for a user, and a disk image for a user are required. The OS image and the disk image for the user are forms shared by the operation servers 300 by using the shared storage 400. The user profile may be present in each operation server 300. When a VM use request is generated from the client 100, the CB 200 may allocate work considering user authentication and load distribution. Further, the VM use request may be processed through an agent program of the operation server 300 including the hypervisor. The operation server 300 may transmit a result of allocation or non-allocation of the VM according to the processing of the VM use request to the client 100 as a response again. In the present invention, the operation servers 300 may have the same user profiles for each user terminal and be configured in a form sharing the same OS image and the same disk (storage), and thus, the operation servers 300 may support a function for improving ability so as to enable another operation server 300 to provide the service instead of one operation server 300 when the one operation server 300 stops an operation thereof. To this end, the operation server 300 may include one or more virtual machines provided to the client, the hypervisor supporting driving of the virtual machine, and an agent for calling the OS image and the user disk image pre-stored in the shared storage and supporting the provision of the virtual machine to the client as illustrated. Here, the agent may support the generation of the OS image and the user disk image related to the client by using an image generator, and control the OS image and the user disk image to be stored in the shared storage.

In order to support the desktop service in the present invention, the user terminal is divided according to a VM use method and the virtual machine is allocated thereto. In this case, the CB 200 may classify the user terminal registration information into an allocated user, a pooled user, and a multi-VM user.

The allocated user is a user continuously using its own allocated virtual machine, and has its own permanent virtual machine. Basically, the allocated user may be divided into a user adopting a preset method and a user adopting a manual method. The preset method is a method of determining, by a service provider, a virtual machine environment of a user in advance, and providing the determined virtual machine environment. The manual method is a method of enabling a user to set a virtual machine of the user. The pooled user has a virtual machine for only one time use. When the user terminal divided as the pooled user is logged off from the operation server, the virtual machine used by the user terminal is deleted, and when the user terminal accesses the operation server again, a new virtual machine is allocated to the user terminal. The operation server 300 does not store a personal profile of the user when the access of the user terminal of the pooled user is released. The multi-VM user refers to a user designated to be allowed to use several virtual machines.

Figure 2:
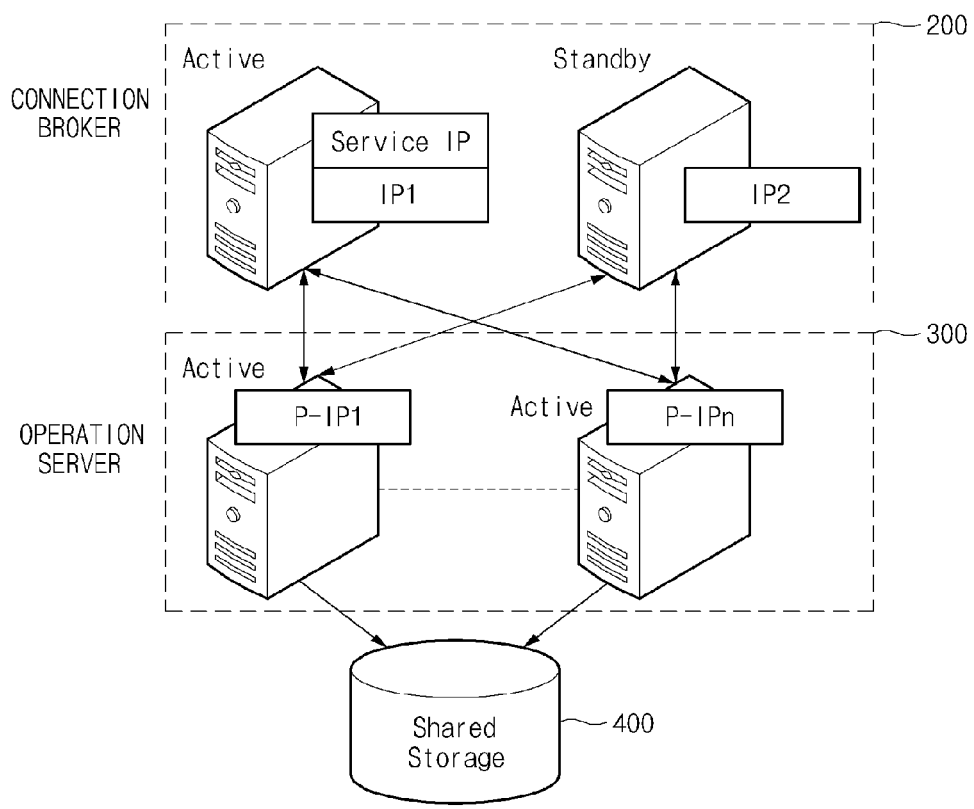
FIG. 2 is a diagram illustrating a server configuration in the entire configuration of a server virtual machine providing system for providing a high ability (HA) server virtual machine according to the exemplary embodiment of the present invention.

FIG. 2 is a diagram illustrating a server configuration in the entire configurations of a high ability (HA) server virtual machine providing system according to the exemplary embodiment of the present invention.

As illustrated in FIG. 2, in the server virtual machine providing system of the present invention, the CB 200 may be configured in an active-standby form, and the remaining operation servers 300 may be configured in an active-active form for HA. The server virtual machine providing system clusters the CB 200 and the whole operation servers 300, and cross-confirms states of the servers. As previously described with reference to FIG. 1, the server virtual machine providing system of the present invention supports a plurality of user virtual machines to be present in several operation servers (at least two), not in only one operation server 300. Accordingly, the server virtual machine providing system of the present invention may allocate a virtual machine of another operation server to the client 100 corresponding to the user terminal when a problem is generated in the operation server, to which the virtual machine is allocated, thereby providing a virtual desktop service without disconnection.

Figure 3:
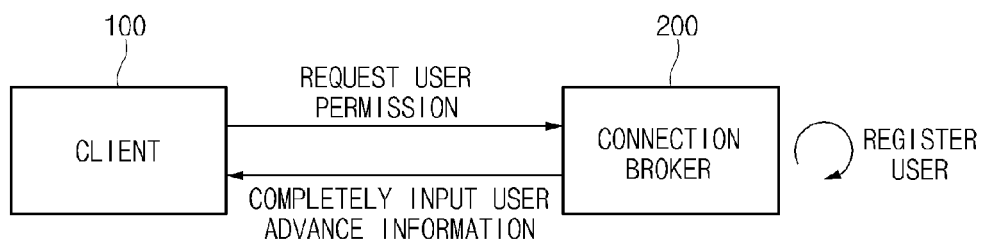
FIG. 3 is a diagram for describing user permission in the virtual desktop service according to the exemplary embodiment of the present invention.

FIG. 3 is a diagram for describing user permission in the virtual desktop service according to the exemplary embodiment of the present invention.

Referring to FIG. 3, for the operation of the virtual desktop service of the present invention, the client 100 corresponding to each user terminal needs to first get a permission to use a virtual machine of the client 100. To this end, the client 100 may access the CB 200 by using a communication module. Next, the client 100 may input basic advance information for user registration. In this case, the client 100 may write identity information about the client 100 (name, unique ID, address, e-mail, telephone number, and the like) for using the virtual machine, and then make a request for allocation of the virtual machine to a service provider, for example, the CB 200. In this process, the client 100 may make the request for allocation of the virtual machine by various methods, such as a method of directly applying the allocation of the virtual machine through a web provided by the CB 200, or a method of applying the allocation of the virtual machine through an email. Further, in a general company, a public institution, or the like, the user terminal may not directly apply the allocation of the virtual machine, but user information may be provided to a manager of a service providing company, for example, a manager of the CB 200, in a lump. To this end, the CB 200 may support a manager direct registration method of using a management tool for registering user information in a lump.

When the permission to use the user virtual machine is completed, the client 100 sets log-in ID and password of the client 100 by using a web or a client program, and performs a log-in process in the CB 200. In this case, in the setting of the log-in ID and password, the user terminal may generate the log-in ID and password with an essential item field (for example, a resident registration number, an employee identification number, or an ID designated by the service provider). The CB 200 may authenticate information of the essential item field and the log-in information about the client 100 based on previously set information.

Figure 4:
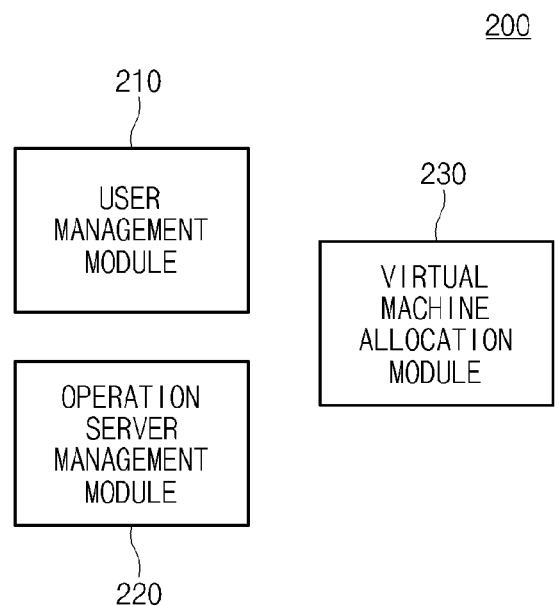
FIG. 4 is a diagram schematically illustrating a configuration of a connection broker for supporting the virtual desktop service according to the exemplary embodiment of the present invention.

FIG. 4 is a diagram schematically illustrating a configuration of the connection broker for supporting the virtual desktop service according to the exemplary embodiment of the present invention.

Referring to FIG. 4, the CB 200 of the present invention may include a user management module 210, an operation server management module 220, and a virtual machine allocation module 230.

The user management module 210 supports the access of the client 100, the user information registration, and the like. The user management module 210 may establish a communication channel with the client 100 by controlling the communication module of the CB 200, and provide the client 100 with a web page, and the like, for the user information registration. Otherwise, when the user management module 210 receives an email and the like, in which the user information is written, from the client 100, the user management module 210 parses the corresponding user information to perform the user information registration. In this process, the user management module 210 may classify the user terminal registration information for each client 100. For example, the user management module 210 may classify each client 100 into a user terminal, to which a server VM is to be semi-permanently allocated, as an allocated user, a user terminal, to which the server VM is to be allocated, as a pooled user, and a user terminal, to which the server VM is to be allocated, as a multi-VM user. To this end, the user management module 210 may provide the client 100 with an item through which any one of the user terminal registration information may be selected. In this process, the user management module 210 may record the classification of the user terminal registration information related to the allocation of the server VM according to a charging policy. When the client 100, which does not separately select the item, accesses, the user management module 210 may classify the client 100 as the pooled user.

The operation server management module 220 may manage states of the plurality of operation servers. For example, the operation server management module 220 may collect information about server VM allocation states of the operation servers. Further, the operation server management module 220 may transmit the state information of the operation servers to the virtual machine allocation module 230. In the meantime, the operation server management module 220 may transmit the user terminal registration information provided by the client 100 to the operation servers.

The virtual machine allocation module 230 may receive access information about the client 100 from the user management module 210, and confirm the user terminal registration information. Further, the virtual machine allocation module 230 may determine a server VM to be allocated based on the user terminal registration information. For example, the virtual machine allocation module 230 may determine whether to provide the logged-in client 100 with a previously allocated server VM, or a temporary server VM, or provide information about a plurality of server VMs and provide the selected specific server VM. When the server VM allocation is determined, the virtual machine allocation module 230 confirms the state information about the operation servers from the operation server management module 220. Further, the virtual machine allocation module 230 may make a request for server VM allocation to at least one operation server according to the states of the operation servers. Further, the virtual machine allocation module 230 may receive access information and access permission information about the server VM from the corresponding operation server, and transmit the received access information and access permission information to the client 100. In the meantime, in a case where the operation server 300 is designed to directly transmit the server VM access information and access permission information to the client 100, the virtual machine allocation module 230 may not perform the transmission of the information related to the server VM.

The virtual machine allocation module 230 may involve a control of the OS image and a user disk image necessary to provide the virtual machine to the client 100. For example, the virtual machine allocation module 230 may control the operation of the image generator for generating the OS image and the user disk image, or support the control of the specific operation server 300 performing the operation of the image generator. Accordingly, the virtual machine allocation module 230 may control the storage of the OS image and the user disk image in the shared storage 400. Location information in the shared storage 400 may be provided to the operation server 300 so that the OS image and the user disk image may be used in the process of providing the virtual machine by the operation server 300. In the meantime, in a case where the operation server 300 directly involves the generation and the storage of the OS image and the user disk image, the function related to the image generator of the virtual machine allocation module 230 may be omitted.

Figure 5:
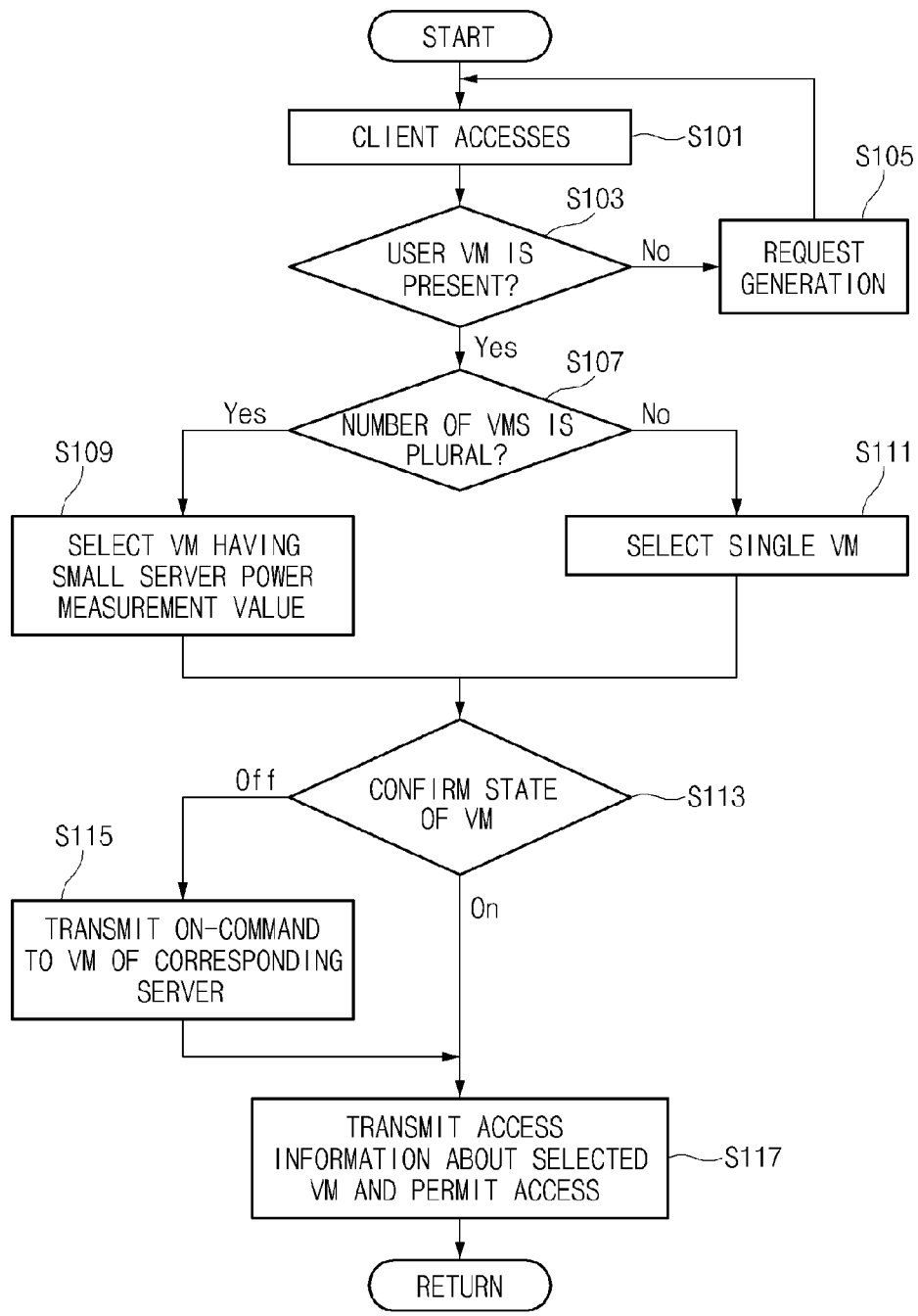
FIG. 5 is a diagram for describing generation and allocation of a virtual machine of an allocated user in the virtual desktop service according to the exemplary embodiment of the present invention.

FIG. 5 is a diagram for describing generation and allocation of a virtual machine of an allocated user in the virtual desktop service according to the exemplary embodiment of the present invention. In FIG. 5, when the client 100 first logs in, the CB 200 may identify the type of user terminal registration information of the client 100, and determine a virtual machine for allocation according to the corresponding information.

Referring to FIG. 5, in step S101, the CB 200 confirms the user terminal registration information when the client 100 accesses, and when the user terminal registration information contains allocated user information, the CB 200 may perform a procedure for generating and allocating the server VM for the client 100. To this end, in step S103, the CB 200 may determine whether a user VM allocated to the corresponding client is present when the allocated user client 100 accesses and logs in.

When the user VM is not allocated to the corresponding client 100, the method branches to step S105 and the CB 200 may make a request for generation of a virtual machine to the client 100. To this end, the CB 200 may transmit a virtual machine generation request message to the client 100 by using a web page, a message, and the like. Then, the client 100 may perform a procedure for generating the virtual machine according to a characteristic of the user terminal or a user's request. In this case, when the generation of the virtual machine is failed, the client 100 may make a request for the generation of the virtual machine to a manager of the CB 200, and perform the generation of the virtual machine. When the generation of the virtual machine is completed, information about the generated virtual machine is stored in a DB, and when the client 100 logs in the CB 200 by using the value stored in the DB, the CB 200 may determine whether the user virtual machine is present in the corresponding client 100 again. As previously described with reference to FIGS. 1 and 2, the CB 200 and the operation server 300 may configure a system in a form of supporting a load distribution function and a fail over function in which a plurality of the same virtual machines is present.

In the meantime, when the user VM is present in step S103, the method branches to step S107 and the CB 200 may confirm whether the number of VMs allocated to the corresponding client 100 is plural. Here, when the number of corresponding VM is plural, the method branches to step S109 and the CB 200 may control a VM having a small server power measurement value to be selected. To this end, the CB 200 may confirm characteristics of the operation servers, and control an operation server having a relatively better data processing characteristic to be selected. In the meantime, when the number of VMs allocated to the corresponding client 100 is single in step S107, the method branches to step S111 and the CB 200 may control a single VM to be selected.

Next, the CB 200 may confirm a state of the selected VM, and confirm whether the current state of the selected VM is in an on state or an off state in step S113. When the selected VM is in the off state, the method branches to step S115 and the CB 200 may transmit a turn-on command to the corresponding server VM. Next, the method branches to step S117 and the CB 200 may transmit access information about the selected VM to the client 100, and support the client 100 to access by transmitting access permission information.

Figure 6:
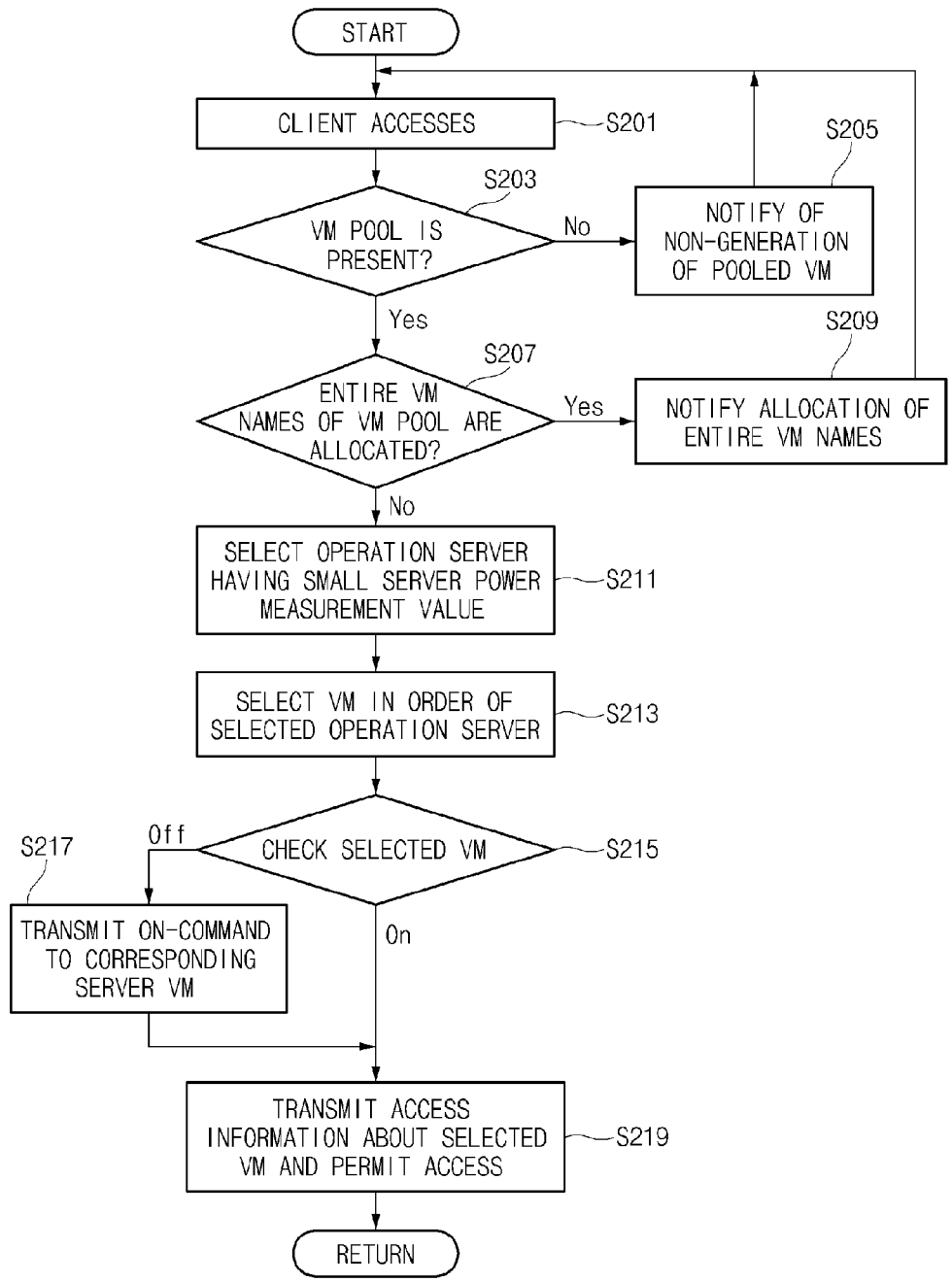
FIG. 6 is a diagram for describing generation and allocation of a virtual machine of a pooled user in the virtual desktop service according to the exemplary embodiment of the present invention.

FIG. 6 is a diagram for describing generation and allocation of a virtual machine of a pooled user in the virtual desktop service according to the exemplary embodiment of the present invention.

Referring to FIG. 6, when the client accesses the CB 200 in step S201, the CB 200 may confirm user terminal registration information by using log-in information obtained when the client accesses. Then, when the user terminal registration information is a pooled user, the CB 200 determines that a virtual machine allocated to the corresponding client 100 is a non-existing type, and the method branches to step S203, and the CB 200 may confirm whether a VM pool is present. When the VM pool is not present in step S203, the method branches to step S205, and the CB 200 may notify the client 100 of non-generation of a pooled VM. Then, the client 100 may process a request for generation of the VM pool and a series of processes for the request for generation of the VM pool through various methods, such as web access or transmission of an email, for use of the server VM service. The client 100 may access the CB 200 again when the process of generating the VM pool is completed.

When the VM pool is present in step S203, the method branches to step S207, and the CB 200 may confirm whether the entire VM names of the VM pool are allocated. Further, when the entire VM names of the VM pool are already allocated, the method branches to step S209, and the CB 200 may notify the client 100, which makes a request for the VM allocation, of the allocation of the entire VM names. That is, the CB 200 may notify that there is no VM to be allocated to the client 100. In this case, the CB 200 may provide the client 100 with expected standby time information based on a statistical experiment material and the like.

In the meantime, when the entire VM names of the VM pool are not allocated in step S207, that is, a VM name, which may be allocated to the client 100, is present, the method branches to step S211, and the CB 200 may select an operation server having a small server power measurement value among the operation servers belonging to the VM pool. Then, the CB 200 may select the VM for allocation of the VM in an order of the VMs within the selected operation server in step S213. Then, the CB 200 checks a state of the selected VM in step S215, and when the state of the selected VM is in an off state, the method branches to step S217 and the CB 200 may transmit a turn-on command to the corresponding server VM. The CB 200 may transmit access information and access permission information about the selected VM to the client 100 in step S219.

The CB 200 of the present invention supports a temporarily usable VM to be allocated to the pooled user from a virtual machine pool. In the present invention, the virtual machine belonging to the virtual machine pool uses a virtual machine pre-generated by the operation server 300 under a control of the CB 200, so that a function of generating the virtual machine according to the request of the client 100 is not supported.

Figure 7:
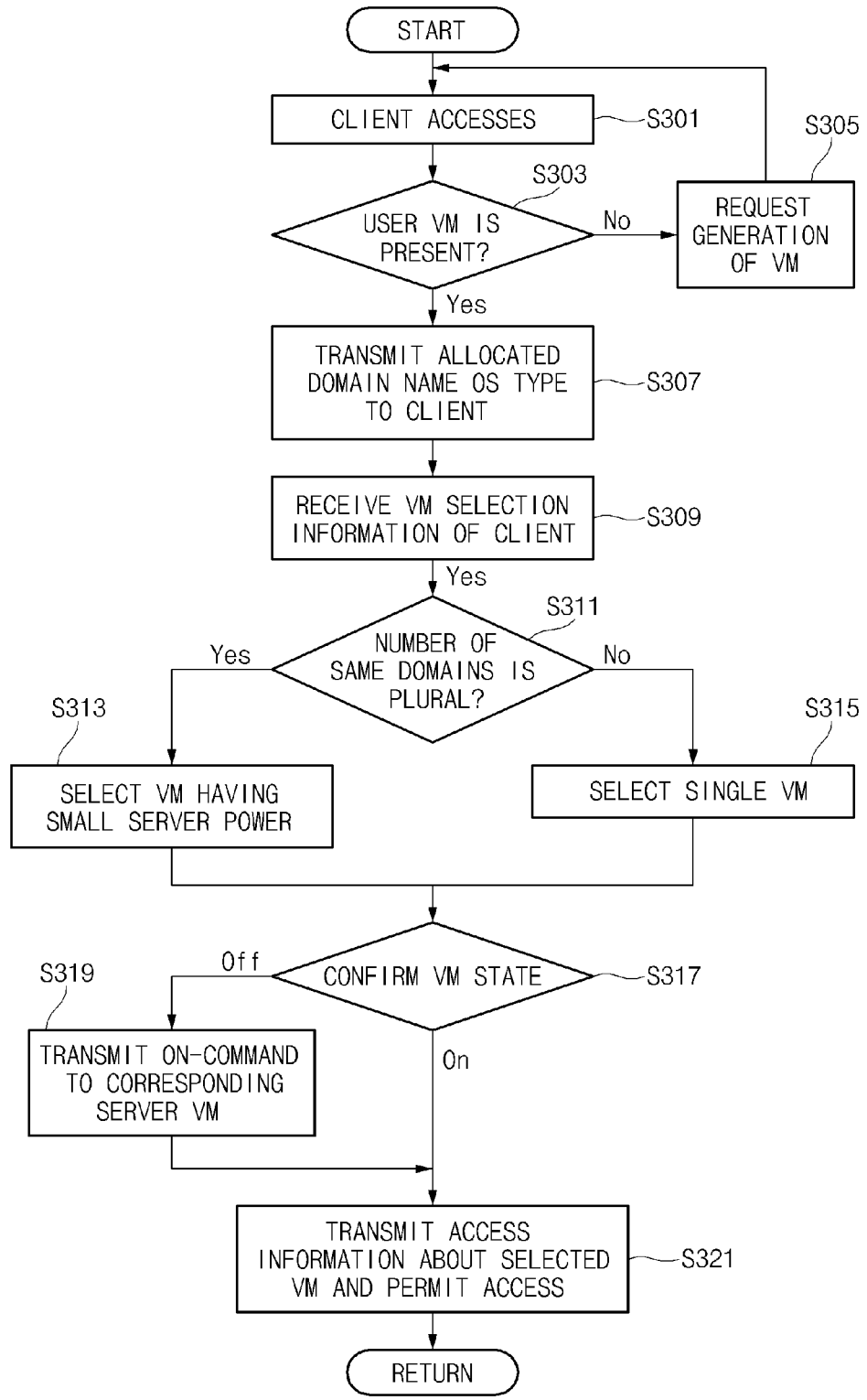
FIG. 7 is a diagram for describing generation and allocation of a virtual machine of a multi-VM user in the virtual desktop service according to the exemplary embodiment of the present invention.

FIG. 7 is a diagram for describing generation and allocation of a virtual machine of a multi-VM user in the virtual desktop service according to the exemplary embodiment of the present invention.

Referring to FIG. 7, in order to provide the virtual desktop service of the present invention, the CB 200 may support processing of an access of a client in step S301. The client 100 may log-in when accessing the CB 200. In this process, the CB 200 may confirm that the client 100 is a multi-VM user through confirmation of the user terminal registration information, and may confirm whether a user VM allocated to the corresponding client 100 is present in step S303. When the user VM is not present in step S303, the CB 200 may transmit a user VM generation request to the client 100 in step S305. Then, the client 100 may process the user VM generation through various methods, such as web access or email. When the user VM is present in step S303, the CB 200 may transmit an allocated domain name OS type to the client in step S307. The corresponding client 100 may have a plurality of allocated virtual machines according to multi-VM user type user terminal registration information. Accordingly, the CB 200 transmits information about all of the VMs allocated to the client 100. To this end, the CB 200 may collect and manage information about an virtual machine allocation state of the operation servers 300.

Next, the CB 200 may receive VM selection information of the client 100 in step S309. In this process, the client 100 may transmit VM selection information which the client 100 desires to access among the plurality of elements of VM information provided by the CB 200 to the CB 200. The CB 200 may confirm whether the number of same domains is plural in step S311, and when the plurality of domains is present, the method branches to step S313, and the CB 200 may select the VM having low server power. In the meantime, when the number of same domains is one, the CB 200 may select one VM in step S315. Then, the CB 200 may check a state of the selected VM in step S317, and when the state of the selected VM is an off state, the method branches to step S319 and the CB 200 may transmit a turn-on command to the corresponding server VM. The CB 200 may transmit access information, and access permission information about the selected VM and the on-state VM to the client 100.

As described above, in order to allocate the multi-VM user type VM of the present invention, the CB 200 supports the client 100 to select a virtual machine which the client 100 desires to access. An operation after the client 100 selects the virtual machine is the same allocation and the same access as those in the aforementioned case of the allocated user.

In the meantime, in a case of the allocated user and the multi-VM user, only a user registered as a user may generate the VM of the user in the client. The client 100 generates the VM by inputting a name of the virtual machine, which the client 100 is to use, the number of CPUs, a capacity of a memory, a capacity of a storage space, information about an operation system to be used, and the like. The aforementioned function may be requested to the manager, not the user, and the manager may also execute contents of the received request in a local by using a management tool.

Figure 8:
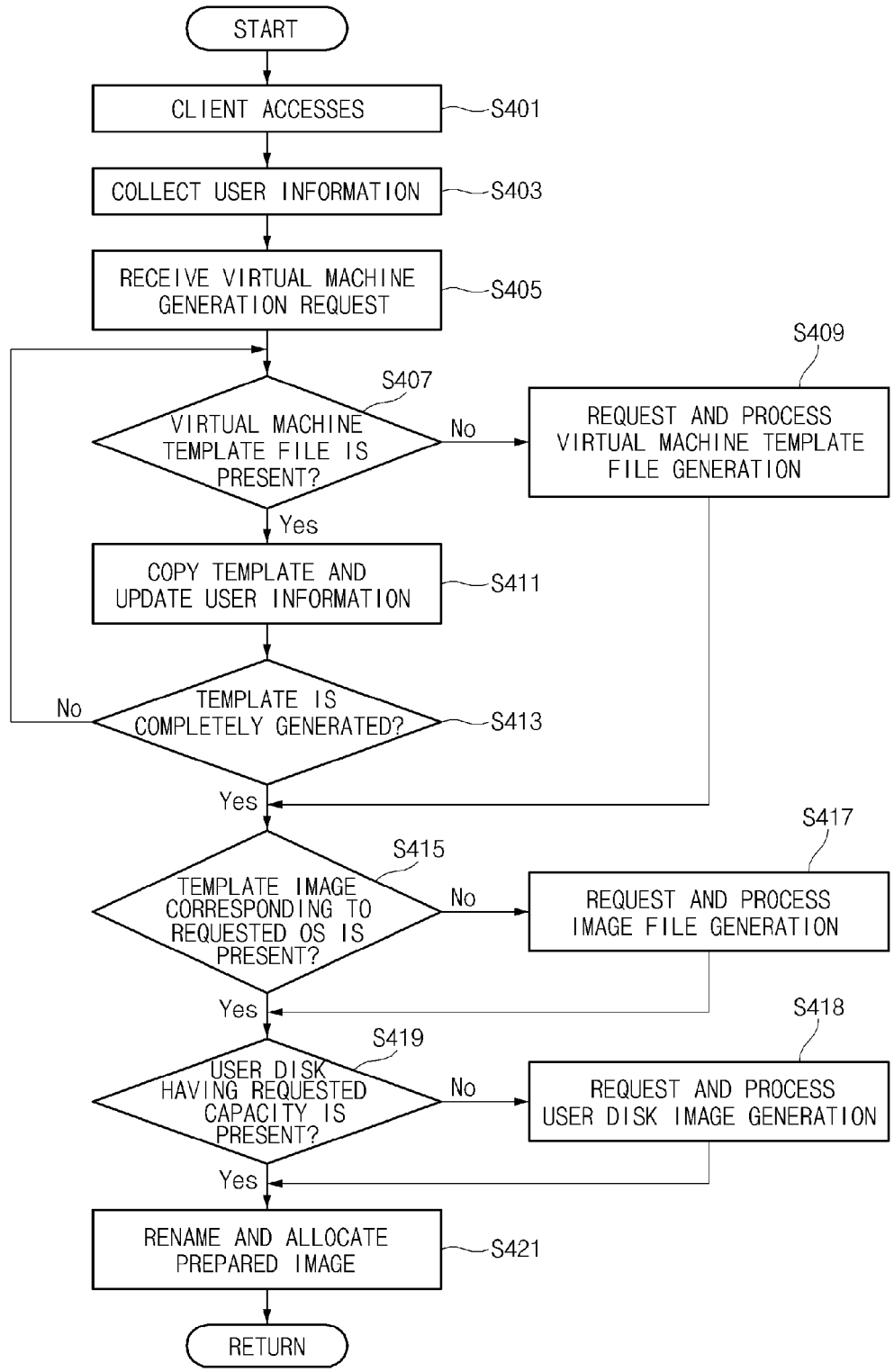
FIG. 8 is a diagram for describing a method of generating a virtual machine according to a request of a user.

FIG. 8 is a diagram for describing a method of generating a virtual machine according to a request of a user.

Referring to FIG. 8, the client 100 may access the CB 200, and request VM information in step S401. The CB 200 may collect user information input by the client 100 in step S403, and receive a virtual machine generation request in step S405. Here, the user information is information about a resource and OS information to be used in the VM. The CB 200 may transmit the virtual machine generation request to the operation server 300 by using the user information, and the operation server 300 generates a virtual machine template file. In this process, the operation server 300 may confirm whether the virtual machine template file corresponding to the user information is present in step S407. Here, when the virtual machine template file is not present, the method branches to step S409, and the operation server 300 may request and process virtual machine template file generation.

When the virtual machine template file generation request is transmitted to the client 100, the client 100 may perform a procedure for generating the virtual machine template file according to the virtual machine template file generation request. The virtual machine template file is a file storing an attribute of the used virtual machine, and may be served in a state where a golden template file preset by the manager is present. When the present golden template file is not present, the virtual machine template file is supported to be generated through a template generator, and work according to the virtual machine generation request may be temporarily stopped until the golden template file is generated. In the meantime, when the virtual machine template file is present in step S407, the method branches to step S411 and the operation server 300 may copy the template and update the user information. Then, the operation server 300 may confirm whether the template is completely generated in step S413, and when the template is not completely generated, the method may branch to the step before step 407.

When the virtual machine template file is completely generated in step S413, the operation server 300 allocates an OS image and the user disk of the client 100, and checks whether a previously generated template image is present in step S415. In this step, when the template image corresponding to the requested OS of the client 100 is not present, the method branches to step S417 and the operation server 300 may request and process template image generation to the client 100. In this case, the generation of the file by using an image generator is requested, and work is temporarily stopped in order to generate the template image. When the template image is present in step S415, the operation server 300 may confirm whether a user disk having a capacity requested by the client 100 is present in step S419. When the corresponding user disk is not present, the operation server 300 may request and process user disk image generation to the client 100 in step S417. When the template image and the user disk are present, the operation server 300 renames the template file to have a set name and allocates the template file to the client 100, and renames the user disk by the same method in step S421.

In the meantime, the template image generation request and the user disk image generation request in the aforementioned process may be performed under the control of the operation server 300, or under the control of the CB 200. When the template image generation request and the user disk image generation request are performed under the control of the CB 200, the operation server 300 may transmit the image generation request to the client 100 through the CB 200, and the client 100 may process the image generation request through the CB 200. Otherwise, when the operation server 300 is designed to establish the communication channel with the client 100, and support the image generation request transmission and processing of the image generation request transmission, the client 100 may also process the image generation request through the operation server 300.

In the meantime, in order to establish a virtual machine generation flow, the manager prepares the template file for the service in advance, and makes the template file be recognized by the system.

The OS image of the user and the user disk image may be provided according to the generation request of the client 100 in a state where the OS image of the user and the user disk image are prepared in advance. To this end, the client 100 may generate the OS image and the user disk image through a template file generator and the image generator in advance. Accordingly, a basic golden template file and a golden image file may be generated and stored before the allocation of the VM to be used during the operation of the system. The generated golden image file and golden template file may be provided to the client 100 in real time when the client 100 makes a request for the golden image file and the golden template file, and may be used for simply coping and reconfiguring the template file, pre-coping the template image, maintaining the specific number of template images, and allocating the rename.

Since a size of the template file is not large, the method of generating the virtual machine may be performed by a method in which the template file may be simply copied. However, since a size of the OS image is very large, in order to perform the request to the virtual machine in real time, a method of pre-setting the OS image and the user disk image to be provided when the image is requested by driving the image generator is efficient.

Figure 9:
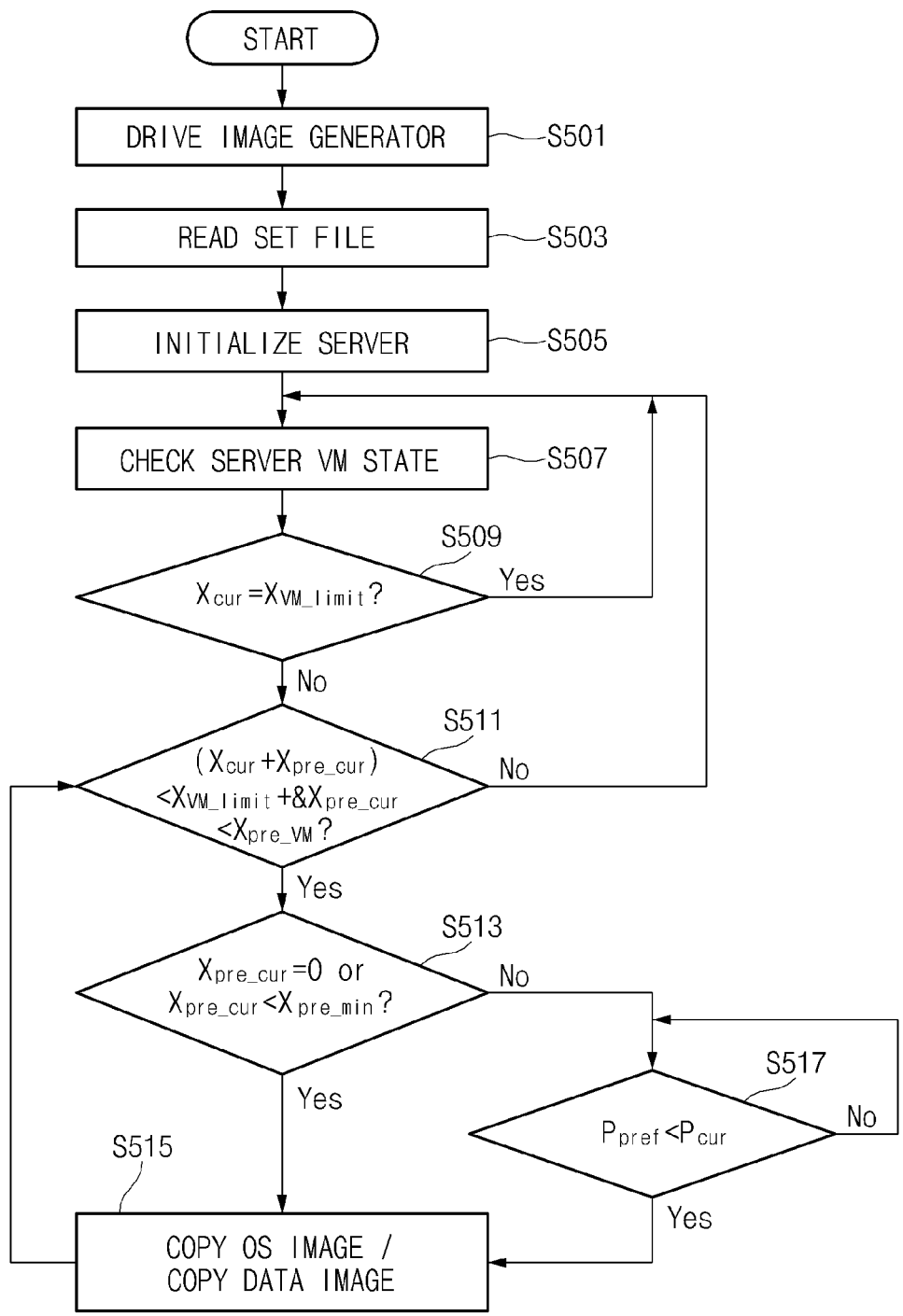
FIG. 9 is a flowchart for describing an operation of an image generator of the present invention.

FIG. 9 is a flowchart for describing an operation of the image generator of the present invention.

Referring to FIG. 9, in order to operate the image generator of the present invention, the operation server 300 performs the driving of the image generator in step S501. Then, the operation server 300 may read a set file in step S503. Values of Xvm_limit and Xpre_vm, a type of used OX, and positions of the golden image file and the golden template file may be fetched as an initial setting file.

Next, the operation server 300 may initialize a server in step S505. In the server initialization operation, an item related to the set file is checked. The operation server 300 may temporarily stop the operation when the golden image file and the golden template file are not present. Next, the operation server 300 may check a server VM state in step S507. The operation server 300 may confirm whether the number (Xcur) of current VMs is equal to the maximum number (Xvm_limit) of installable images per operation server in step S509. That is, when the aforementioned initialization operation is performed, the operation server 300 checks the number of current VMs and confirms whether the number (Xcur) of current VMs is equal to the value of Xvm_limit, and when the number of current VMs is equal to the value of Xvm_limit, the corresponding operation server may not install the virtual machine any more, so that the method branches to the step before step S507, and the operation server 300 may continuously check the server VM state.

In the meantime, when Xcur is not equal to Xvm_limit in step S509, the operation server 300 may confirm whether a condition represented in Equation 1 below is satisfied in step S511.

$$(X_{cur}+X_{pre\_cur}) < X_{vm\_limit} \,\&\, X_{pre\_cur} < X_{pre\_vm} \qquad \text{[Equation 1]}$$

In Equation 1, Xcur indicates the number of current VMs, Xpre_cur indicates the number of currently prepared VMs, Xvm_limit indicates the maximum number of installable images per operation server, and Xpre_vm indicates the maximum number of maintained images per operation server.

When the condition of Xvm_limit&Xpre_cur is not satisfied in step S509, the method branches to the step before step S507 and the operation server 300 may control the steps after step S507 to be re-performed. Further, when the condition of Xvm_limit&Xpre_cur is satisfied in step S509, the method branches to step S513 and the operation server 300 may confirm whether Equation 2 below is satisfied.

$$Xpre\_cur == 0 \text{ or } Xpre\_cur < Xpre\_min \qquad [\text{Equation 2}]$$

In Equation 2, Xpre_cur indicates the number of currently prepared VMs, and Xpre_min indicates the minimum number of maintained images per operation server.

When the condition described in step S513 is satisfied, the operation server 300 may copy the OS image and the data image in step S515. Then, the method branches to step S511, and the operation server 300 may confirm whether a corresponding condition is satisfied. In the meantime, when the corresponding condition is not satisfied in step S513, the method branches to step S517, and the operation server 300 may confirm whether an ability amount Pref operable by the operation server is smaller than an ability amount of a server. That is, the operation server 300 investigates a server power measurement value or the ability amount of the server, and waits until the ability amount Pref operable by the operation server is smaller than the server power measurement value or the ability amount of the server and copies the image. Such an operation is a method for improving utility of a CPU by the copy of the server.

In the meantime, it is described that the image generator is driven by the operation server 300, but the present invention is not limited thereto. That is, the CB 200 may provide the client 100 with the image generator, and support the client 100 to generate the OS image and the user disk image, and then support the generated OS image and user disk image to be stored in the shared storage 400 or to be stored in the shared storage 400 through the operation server 300. The CB 200 and the operation server 300 may manage location information about the OS image and the user disk image stored in the shared storage 400 for each client in order to provide the virtual machine.

As described above, the method and the system for providing the server virtual machine according to the exemplary embodiment of the present invention, and the apparatus supporting the same may differently support the VM provision form according to the user terminal registration information or the type of user terminal which is pre-registered by the client 100 corresponding to the user terminal. The operation supports the user OS image and the user disk image, which are to be allocated to the client 100, to be provided within a short time as a result, thereby improving a virtual machine allocation speed. Further, the present invention allocates the prepared image file, thereby minimizing the operation, such as the generation of the VM and the copy of the image, and thus minimizing a load of the server.

The aforementioned exemplary embodiment of the present invention is for the purpose of illustration, and those skilled in the art may implement various modifications, changes, replacements, and additions through the technical spirit and scope of the accompanying claims, and it will be appreciated that the modification, and the change, and the like belong to the scope of the accompanying claims.

What is claimed is:

1. A system for providing a virtual machine, comprising:
   a client device configured to receive allocation of a virtual machine for using a virtual desktop service; and
   a connection management server, including a hardware processor, configured to select a virtual machine of one of a plurality of operation servers and to allocate the selected virtual machine to the client device according to registration information of the client device;
   wherein the connection management server is configured to identify a type of the client device from the registration information, and to support a secure access of the client device according to the identified type of the client device,
   wherein the type of the client device includes an allocated user, a pooled user, and a multi-virtual machine user,
   wherein the connection management server is configured to provide a previously allocated virtual machine to the allocated user,
   wherein the connection management server is configured to temporarily provide a virtual machine belonging to a virtual machine pool to the pooled user,
   wherein the connection management server is configured to delete a virtual machine used by the client device when the client device identified as the pooled user is logged off, and to allocate a new virtual machine to the client device when the client device accesses the connection management server again, and
   wherein the connection management server is configured to provide multiple virtual machines to the multi-virtual machine user.

2. The system of claim 1, wherein the connection management server selects one of the operation servers having a better server power measurement value or a better server ability amount than the others of the operation servers.

3. The system of claim 1, wherein the one operation server controls an OS image and a user disk image related to the client device to be pre-generated and stored in order to provide the virtual machine.

4. The system of claim 1, further comprising
   a shared storage configured to store data related to the client device for providing the virtual machine, and to provide the stored data to the plurality of operation servers.

5. The system of claim 4, wherein the shared storage pre-stores an OS image and a user disk image for the provision of the virtual machine.

6. A method of providing a server virtual machine at a connection management server, the method comprising:
   sending access information to a client;
   identifying a type of the client from registration information of the client;
   selecting a virtual machine of one of a plurality of operation servers;
   allocating the selected virtual machine to the client according to the registration information of the client, and
   supporting a secure access of the client according to the identified type of the client,
   wherein the type of the client includes an allocated user, a pooled user, and a multi-virtual machine user,
   wherein the connection management server provides a previously allocated virtual machine to the allocated user, wherein the connection management server temporarily provides a virtual machine belonging to a virtual machine pool to the pooled user, wherein the connection management server deletes a virtual machine used by the client when the client identified as the pooled user is logged off, and allocates a new virtual machine to the client when the client accesses the connection management server again, and wherein the connection management server provides multiple virtual machines to the multi-virtual machine user.

7. The method of claim 6, further comprising:

generating an OS image and a user disk image related to the client before the allocating of the virtual machine; and storing the OS image and the user disk image in a shared storage.

8. A non-transitory computer-readable storage medium containing program instructions, execution of which by a processor of a connection management server causes the connection management server to provide a virtual machine, the program instructions comprising:

instructions to send access information to a client and to identify a type of the client from registration information of the client;

instructions to select a virtual machine of one of a plurality of operation servers, and to allocate the virtual machine according to the registration information of the client, and instructions to support a secure access of the client according to the identified type of the client, wherein the type of the client includes an allocated user, a pooled user, and a multi-virtual machine user, wherein the instructions to support the secure access include instructions to provide a previously allocated virtual machine to the allocated user, to temporarily provide a virtual machine belonging to a virtual machine pool to the pooled user, to delete a virtual machine used by the client when the client identified as the pooled user is logged off, and to allocate a new virtual machine to the client when the client accesses the connection management server again, and to provide multiple virtual machines to the multi-virtual machine user.

\* \* \* \* \*